United States Patent
Rizo et al.

(10) Patent No.: US 10,155,845 B2
(45) Date of Patent: Dec. 18, 2018

(54) POLYMER BLENDS COMPRISING POLYCARBONATE AND POLYMETHYL METHACRYLATE

(71) Applicant: SABIC GLOBAL TECHNOLOGIES B.V., Bergen op Zoom (NL)

(72) Inventors: Helena Varela Rizo, Alicante (ES); Ignacio Vic Fernandez, Murcia (ES); David Del Agua Hernandez, Murcia (ES)

(73) Assignee: SABIC GLOBAL TECHNOLOGIES B.V., Bergen op Zoom (NL)

(*) Notice: Subject to any disclaimer, the term of this patent is extended or adjusted under 35 U.S.C. 154(b) by 0 days.

(21) Appl. No.: 15/573,431

(22) PCT Filed: May 26, 2016

(86) PCT No.: PCT/IB2016/053101
§ 371 (c)(1),
(2) Date: Nov. 10, 2017

(87) PCT Pub. No.: WO2016/189494
PCT Pub. Date: Dec. 1, 2016

(65) Prior Publication Data
US 2018/0112035 A1   Apr. 26, 2018

(30) Foreign Application Priority Data

May 28, 2015   (EP) .................................... 15382282

(51) Int. Cl.
*C08G 64/14* (2006.01)
*C08G 64/18* (2006.01)
(Continued)

(52) U.S. Cl.
CPC ............. *C08G 64/14* (2013.01); *C08G 64/18* (2013.01); *C08G 81/027* (2013.01); *C08L 33/12* (2013.01); *C08L 69/00* (2013.01)

(58) Field of Classification Search
CPC ...... C08G 64/14; C08G 64/18; C08G 81/027; C08L 69/00; C08L 33/12
(Continued)

(56) References Cited

U.S. PATENT DOCUMENTS 7,786,246 B2   8/2010   Jansen et al.
8,426,532 B2 * 4/2013   Huang .................. C08F 283/02
                                                                525/467

(Continued)

FOREIGN PATENT DOCUMENTS

EP       1063253 A1 * 12/2000   ............. B32B 27/08
EP       1063253 A1 * 12/2000   ............. B32B 27/08
WO    2012037461 A2    3/2012

OTHER PUBLICATIONS

Penco et al. "Enthalpy relaxation in bisphenol—A polycarbonate/poly(methyl methacrylate) blends", Polymer Engineering and Science (2007), 47(3), 218-224.*

(Continued)

*Primary Examiner* — Michael Bernshteyn
(74) *Attorney, Agent, or Firm* — Cantor Colburn LLP

(57) ABSTRACT

The disclosure concerns a polymer derived from melt extrusion of (i) 80 to 95 wt % polycarbonate; said polycarbonate having and endcap level of 45% to 80% and a branching level of 300-5,000 m comprising the following branching structures: (ii) 4.9 to 20 wt % polymethyl methacrylate; and (iii) 0.1 to 1.5 wt % of catalyst; wherein the polymer is transparent, and wherein transesterification occurs with at least a portion of the polycarbonate and the polymethyl methacrylate during melt extrusion.

20 Claims, 2 Drawing Sheets

(51) Int. Cl.
*C08G 81/02* (2006.01)
*C08L 33/12* (2006.01)
*C08L 69/00* (2006.01)

(58) Field of Classification Search
USPC ............................................................ 524/556
See application file for complete search history.

(56) References Cited

U.S. PATENT DOCUMENTS 8,440,760 B2  5/2013  Kim et al.
2010/0256288 A1* 10/2010 Kim, II .................. C08L 33/10
524/523

OTHER PUBLICATIONS

Singh et al. "Evidence for in situ graft copolymer formation and compatibilization of PC and PMMA during reactive extrusion processing in the presence of the novel organometallic transesterification catalyst tin(II) 2-ethylhexanoate", RSC Advances (2012), 2(27), 10316-10323.*
Singh et al. "Reactive Compatibilization of Polycarbonate and Poly(methyl methacrylate) in the Presence of a Novel Transesterification Catalyst SnCl2·2H2O", Journal of Physical Chemistry B (2011), 115(7), 1601-1607.*
Penco et al. "Enthalpy relaxation in bisphenol—A polycarbonate/poly(methyl methacrylate) blends", Polymer Engineering and Science (2007), 47(3), 218-224.. (Year: 2007).*
Singh et al. "Evidence for in situ graft copolymer formation and compatibilization of PC and PMMA during reactive extrusion processing in the presence of the novel organometallic transesterification catalyst tin(II) 2-ethylhexanoate", RSC Advances (2012), 2(27), 10316-10323.. (Year: 2012).*
Singh et al. "Reactive Compatibilization of Polycarbonate and Poly(methyl methacrylate) in the Presence of a Novel Transesterification Catalyst SnCl2—2H2O", Journal of Physical Chemistry B (2011), 115(7), 1601-1607. (Year: 2011).*
International Seach Report for International Application No. PCT/IB2016/053101; International Filing Date: May 26, 2016; dated Jul. 12, 2016; 5 Pages.
Li et al., "Fabrication of Nanostructured Polycarbonate/Poly(methyl methacrylate) Blends with Improved Optical and Mechanical Properties by High-Shear Processing," Polymer Engineering and Science (2011) 9 Pages.
Okamoto et al., "Synthesis and Properties of Polycarbonate-Poly(methyl methacrylate) Graft Copolymers by Polycondensation of Macromonomers," Journal of Applied Polymer Science, vol. 80, 2670-2675 (2001).
Singh et al., "Reactive Compatibilization of Polycarbonate and Poly(methyl methacrylate) in the Presence of a Novel Transesterification Catalyst SnCl2 2H2O," J. Phys. Chem. B 2011, 115, 1601-1607.
Written Opinion of the International Searching Authority for International Application No. PCT/IB2016/053101; International Filing Date: May 26, 2016; dated Jul. 12, 2016; 5 Pages.

* cited by examiner

POLYMER BLENDS COMPRISING POLYCARBONATE AND POLYMETHYL METHACRYLATE

CROSS REFERENCE TO RELATED APPLICATIONS

This application is a 371 of International Application No. PCT/IB2016/053101, filed May 26, 2016, which claims priority to European Application No. 15382282.0, filed May 28, 2015 which are incorporated herein by reference in their entirety.

RELATED APPLICATIONS

This application claims benefit of EPO Application No. 15382282, filed May 28, 2015, the disclosure of which in incorporated herein in its entirety.

TECHNICAL FIELD

The disclosure concerns melt extrusion of polymer comprising polycarbonate and polymethyl methacrylate, the product of the extrusion and articles formed from the polymer.

BACKGROUND

Polymer blending is a method to achieve new materials with different properties. Polycarbonate (PC) is a commonly used engineering thermoplastic polymer because of its good impact strength, transparency and electrical properties. However, PC is inferior to many other transparent resins in scratch resistance. In contrast, polymethyl methacrylate (PMMA) has excellent scratch resistance. Blending polycarbonate with PMMA has been studied with the intention of combining the properties of these two polymers—particularly enhanced scratch resistance.

Creating blends of PMMA and PC, however, is problematic. It is known that melt blends of PC and PMMA are immiscible resulting in an opaque blend rather than a transparent blend needed for certain uses such as optical applications. The opaqueness is believed to be due to differences in the refractive index difference between PC and PMMA and the lack of compatibility. Compatibilization is needed to decrease the size of the dispersed phase and achieve a transparent blend. Different strategies have been adopted to produce less opaque PC/PMMA blends. Efforts have focuses on high shear mixing to produce smaller polymer domains (U.S. Pat. No. 8,440,760), modification of the PC and/or PMMA polymers WO 2012/037461), and grafting PMMA side chains to PC (Okamoto, J. Appl. Polym. Sci. 2001, 80, 2670-2675). To date, these efforts have failed to produce a transparent blend. There is a need in the art for transparent polymers that overcome the above deficiencies.

SUMMARY

The disclosure concerns polymer derived from melt extrusion of (i) 80 to 95 wt % polycarbonate; the polycarbonate having and endcap level of 45% to 80% and a branching level of 300-5,000 parts per million by weight (ppm) comprising the following branching structures (A)-(C):

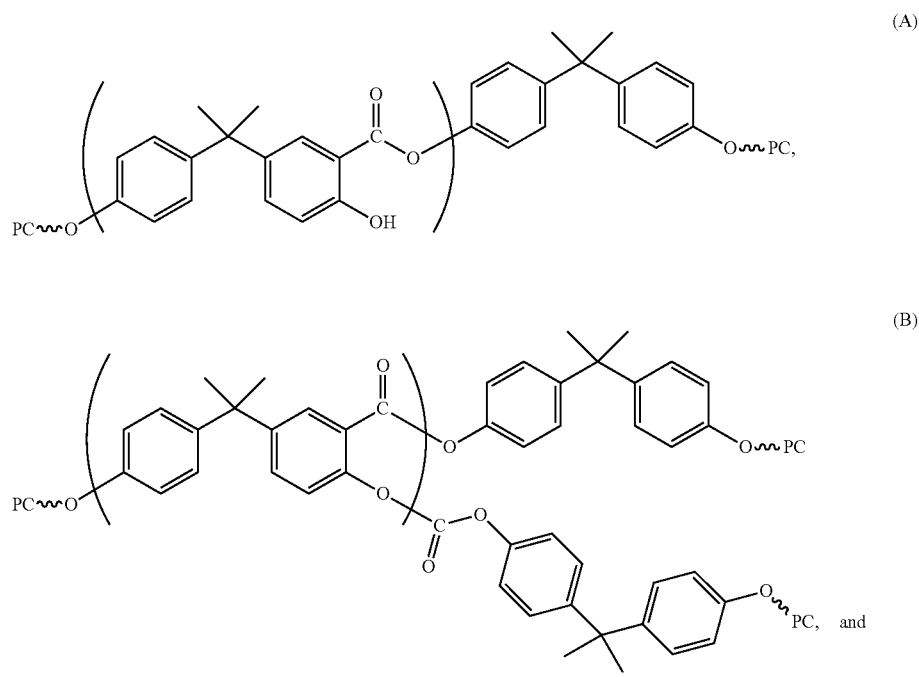

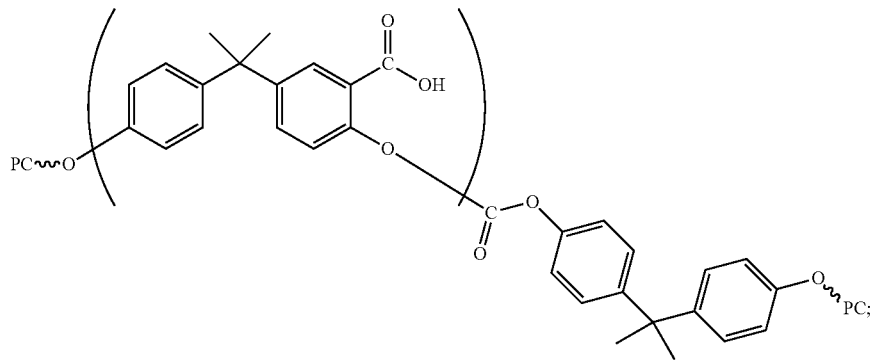

(C)

(ii) 4.9 to 20 wt % polymethyl methacrylate; and (iii) 0.1 to 1.5 wt % of catalyst; wherein the polymer is transparent, wherein transesterification occurs with at least a portion of the polycarbonate and the polymethyl methacrylate during melt extrusion; and wherein the combined wt % value of all components does not exceed 100 wt. %, and wherein all wt % values are based on the total weight of the composition. It is preferred that the polycarbonate has a molecular weight (Mw) of 20,000 to 120,000 Dalton on a polystyrene basis In another aspect, the disclosure concerns methods of forming an article comprising: (a) melt extrusion of (i) 80 to 95 wt % polycarbonate; the polycarbonate having and endcap level of 45% to 80% and a branching level of 300-5,000 ppm; (ii) 4.9 to 20 wt % polymethyl methacrylate (PMMA); and (iii) 0.1 to 1.5 wt % of catalyst to produce a transparent polymer blend; wherein said polymer is transparent, wherein transesterification occurs with at least a portion of the polycarbonate and the polymethyl methacrylate during melt extrusion; and wherein the combined wt % value of all components does not exceed 100 wt. %, and wherein all wt % values are based on the total weight of the composition and (b) molding the polymer blend into said article.

The disclosure also concerns methods of forming a transparent blend of PC and PMMA comprising: (a) melt extrusion of (i) 80 to 95 wt % polycarbonate; the polycarbonate having and endcap level of 45% to 80% and a branching level of 300-5,000 ppm; (ii) 4.9 to 20 wt % polymethyl methacrylate; and (iii) 0.1 to 1.5 wt % of catalyst to produce a transparent polymer blend; wherein said polymer is transparent, wherein transesterification occurs with at least a portion of the polycarbonate and the polymethyl methacrylate during melt extrusion; and wherein the combined wt % value of all components does not exceed 100 wt. %, and wherein all wt % values are based on the total weight of the composition

BRIEF DESCRIPTION OF THE DRAWINGS

The following is a brief description of the drawings wherein like elements are numbered alike and which are exemplary of the various embodiments described herein.

DETAILED DESCRIPTION OF ILLUSTRATIVE EMBODIMENTS

Figure 1:
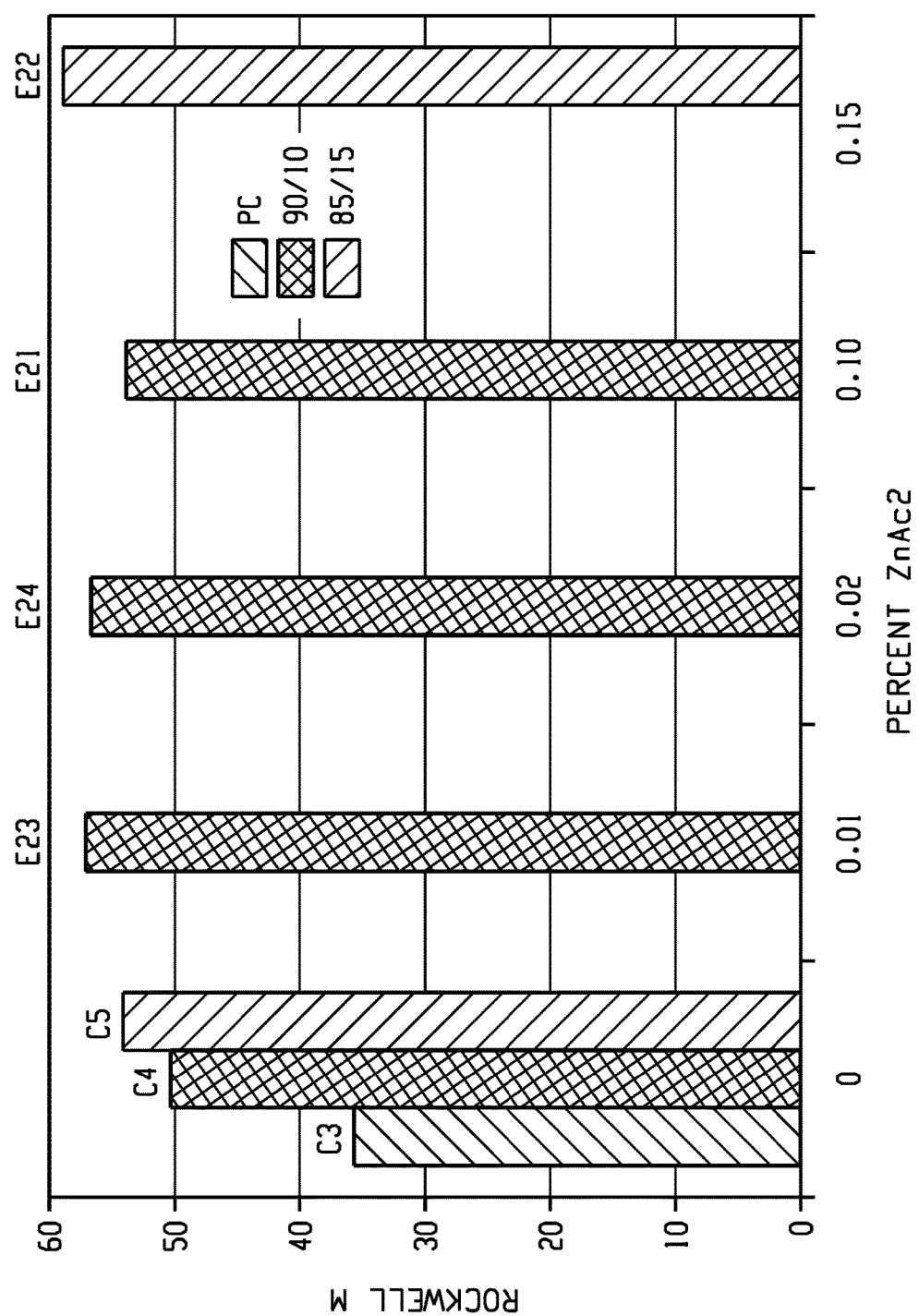
FIG. 1 presents Rockwell M results for reactive blends.

The present disclosure provides for polymer derived from melt extrusion of (i) 80 to 95 wt % polycarbonate; the polycarbonate having and endcap level of 45% to 80%, the polycarbonate having a weight average molecular weight (Mw) of 20,000 to 120,000 Dalton on a polystyrene basis and branching level of 300-5,000 ppm comprising the following branching structures:

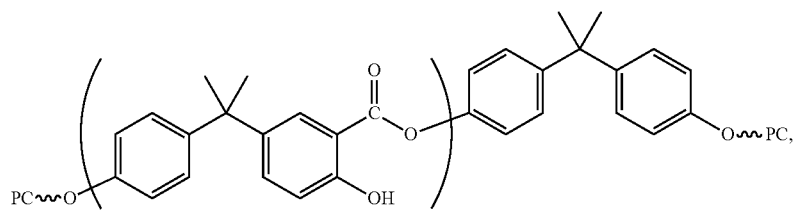

(A)

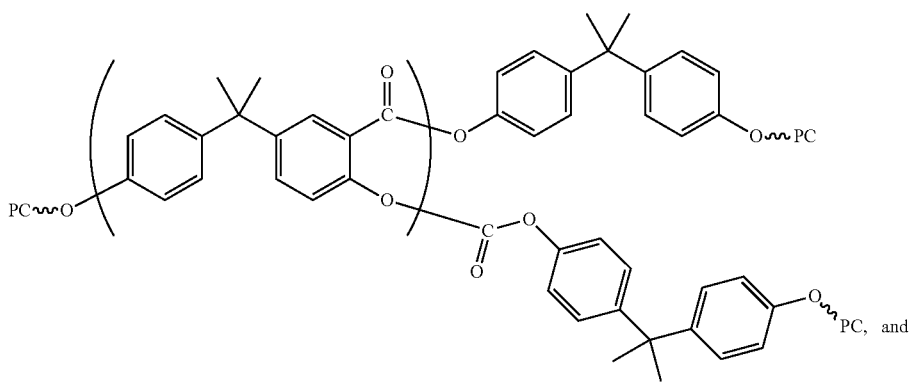

(B)

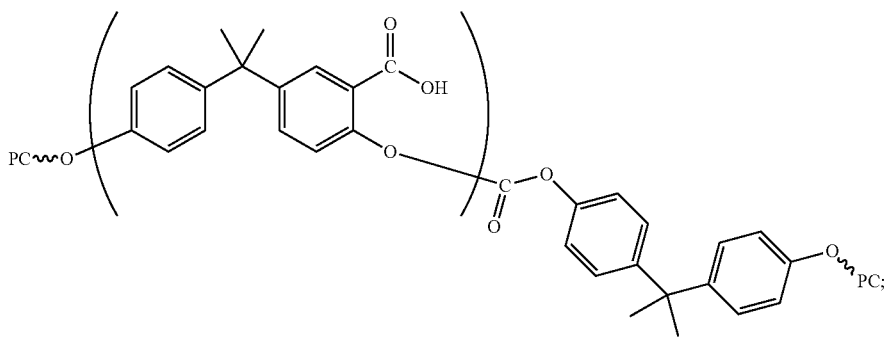

(C)

(ii) 4.9 to 20 wt % polymethyl methacrylate; and (iii) 0.1 to 1.5 wt % of catalyst; wherein the polymer is transparent, wherein transesterification occurs with at least a portion of the polycarbonate and the polymethyl methacrylate during melt extrusion; and wherein the combined wt % value of all components does not exceed 100 wt. %, and wherein all wt % values are based on the total weight of the composition. The PC may be produced by a melt polymerization process.

At least a portion of the PMMA may be located in the polymer backbone with PC in the transesterification product.

Polycarbonate Polymer

The terms "polycarbonate" or "polycarbonates" as used herein includes copolycarbonates, homopolycarbonates and (co)polyester carbonates.

The term polycarbonate can be further defined as compositions have repeating structural units of the formula (1):

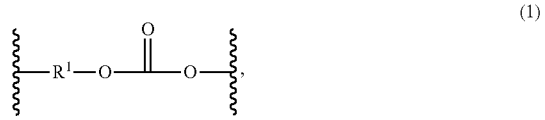

(1)

in which at least 60 percent of the total number of R1 groups are aromatic organic radicals and the balance thereof are aliphatic, alicyclic, or aromatic radicals. In a further aspect, each R1 is an aromatic organic radical and, more preferably, a radical of the formula (2):

-A1-Y1-A2-(2), wherein each of A1 and A2 is a monocyclic divalent aryl radical and Y1 is a bridging radical having one or two atoms that separate A1 from A2. In various aspects, one atom separates A1 from A2. For example, radicals of this type include, but are not limited to, radicals such as —O—, —S—, —S(O)—, —S(O$_2$)—, —C(O)—, methylene, cyclohexyl-methylene, 2-[2.2.1]-bicycloheptylidene, ethylidene, isopropylidene, neopentylidene, cyclohexylidene, cyclopentadecylidene, cyclododecylidene, and adamantylidene. The bridging radical Y1 is preferably a hydrocarbon group or a saturated hydrocarbon group such as methylene, cyclohexylidene, or isopropylidene. Polycarbonate materials include materials disclosed and described in U.S. Pat. No. 7,786,246, which is hereby incorporated by reference in its entirety for the specific purpose of disclosing various polycarbonate compositions and methods for manufacture of the same.

The polycarbonate may be substantially free of halogen atoms. By "substantially free" it is intended that less than 1 wt % of the polycarbonate comprises halogen atoms. Desirably, the polycarbonate comprises no detectable amount of halogen atoms as can be determine in accordance with measuring techniques available as of May 28, 2015.

A melt polycarbonate product may be utilized. The melt polycarbonate process is based on continuous reaction of a dihydroxy compound and a carbonate source in a molten stage. The reaction can occur in a series of reactors where the combined effect of catalyst, temperature, vacuum, and agitation allows for monomer reaction and removal of reaction by-products to displace the reaction equilibrium and effect polymer chain growth. A common polycarbonate made in melt polymerization reactions is derived from bisphenol A (BPA) via reaction with diphenyl carbonate (DPC). This reaction can be catalyzed by, for example, tetra methyl ammonium hydroxide (TMAOH) or tetrabutyl phosphonium acetate (TBPA), which can be added in to a monomer mixture prior to being introduced to a first polymerization unit and sodium hydroxide (NaOH), which can be added to the first reactor or upstream of the first reactor and after a monomer mixer.

The melt polycarbonate product may have an endcap level of 45% to 80%. Some polycarbonates have an endcap level of 45% to 75%, 55% to 75%, 60% to 70% or 60% to 65%. Certain preferred polycarbonates have at least 200 ppm of hydroxide groups. Certain polycarbonates have 200-1,100 ppm, or 950 to 1,050 ppm hydroxide groups.

Polycarbonate polymer may contain endcapping agents. Any suitable endcapping agents can be used provided that such agents do not significantly adversely impact the desired properties of the polycarbonate composition (transparency, for example). Endcapping agents include mono-phenolic compounds, mono-carboxylic acid chlorides, and/or mono-chloroformates. Mono-phenolic endcapping agents are exemplified by monocyclic phenols such as phenol and $C_1$-$C_{22}$ alkyl-substituted phenols such as p-cumyl-phenol, resorcinol monobenzoate, and p- and tertiary-butyl phenol; and monoethers of diphenols, such as p-methoxyphenol.

Additionally, some polycarbonates have 900-1100 ppm and 950 to 1050 ppm of Fries products. Fries products include ester type of structures A, B, and C.

A. Linear Fries:

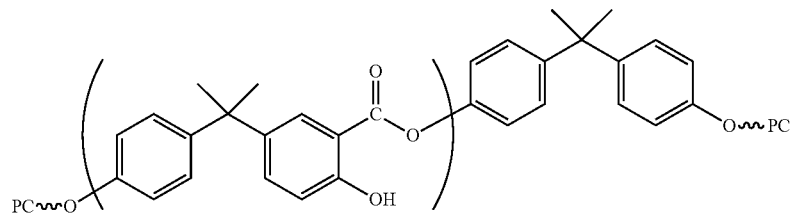

B. Branched Fries:

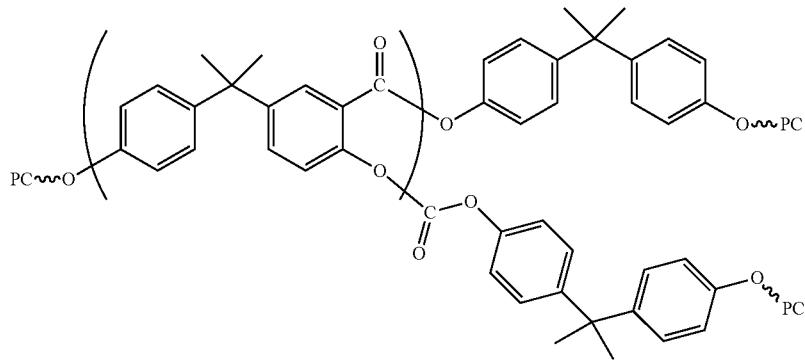

C. Acid Fries:

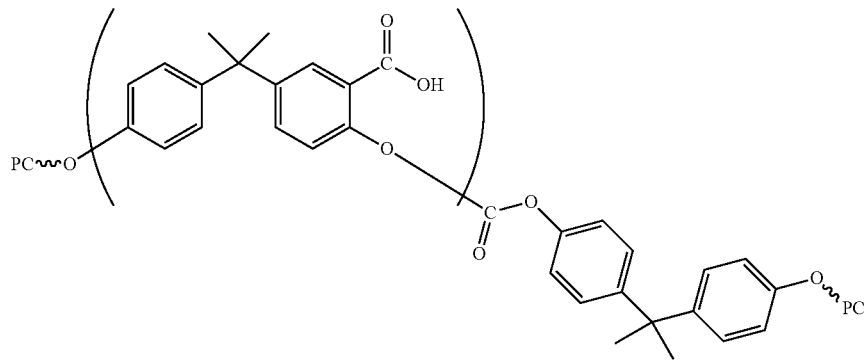

Polymethyl Methacrylate Polymer

The term "polymethyl methacrylate" (or PMMA) is synonymous with the terms poly(methyl 2-methylpropanoate) and poly(methyl methacrylate). As used herein, the term includes homopolymers as well as copolymers of methyl methacrylate and other acrylic monomers, such as for example, ethyl acrylate, and glycidyl methacrylate in which the other acrylic monomer is present to the extent of up to 35 wt % of the composition. The polymethyl methacrylate may be stabilized with ultraviolet and thermal stabilizers and may include other additives discussed herein.

Catalyst

Any suitable catalyst may be used with the disclosed technology. Some preferred catalysts are zinc catalysts. One preferred zinc catalyst is zinc acetate. While any amount of catalyst that accomplishes forming a transparent blend may be used, it is preferred that the amount of catalyst is 0.1 to 1.5 wt % of the polymer blend. Preferably, the amount of catalyst is 0.02 to 1.0 wt % of the polymer blend. It is preferred that at least a portion of the PC and PMMA transesterify in the presence of the catalyst during melt extrusion.

Additional Components

The additive composition can include an impact modifier, flow modifier, filler (e.g., a particulate polytetrafluoroethylene (PTFE), glass, carbon, mineral, or metal), reinforcing agent (e.g., glass fibers), antioxidant, heat stabilizer, light stabilizer, ultraviolet (UV) light stabilizer, UV absorbing additive, plasticizer, lubricant, release agent (such as a mold release agent), antistatic agent, anti-fog agent, antimicrobial agent, colorant (e.g., a dye or pigment), surface effect additive, radiation stabilizer, flame retardant, anti-drip agent (e.g., a PTFE-encapsulated styrene-acrylonitrile copolymer (TSAN)), or a combination comprising one or more of the foregoing. For example, a combination of a heat stabilizer, mold release agent, and ultraviolet light stabilizer can be used. In general, the additives are used in the amounts generally known to be effective. For example, the total amount of the additive composition (other than any impact modifier, filler, or reinforcing agent) can be 0.001 to 10.0 wt %, or 0.01 to 5 wt %, each based on the total weight of the polymer in the composition.

The composition can include various additives ordinarily incorporated into polymer compositions of this type, with the proviso that the additive(s) are selected so as to not significantly adversely affect the desired properties of the thermoplastic composition (good compatibility for example). Such additives can be mixed at a suitable time during the mixing of the components for forming the composition.

Examples of impact modifiers include natural rubber, fluoroelastomers, ethylene-propylene rubber (EPR), ethylene-butene rubber, ethylene-propylene-diene monomer rubber (EPDM), acrylate rubbers, hydrogenated nitrile rubber (HNBR), silicone elastomers, styrene-butadiene-styrene (SBS), styrene-butadiene rubber (SBR), styrene-(ethylene-butene)-styrene (SEBS), acrylonitrile-butadiene-styrene (ABS), acrylonitrile-ethylene-propylene-diene-styrene (AES), styrene-isoprene-styrene (SIS), styrene-(ethylene-propylene)-styrene (SEPS), methyl methacrylate-butadiene-styrene (MBS), high rubber graft (HRG), and the like. Some suitable impact modifies include PC (polycarbonate)/ABS (such as cycoloy PC/ABS) and MBS type formulations.

Heat stabilizer additives include organophosphites (e.g. triphenyl phosphite, tris-(2,6-dimethylphenyl)phosphite, tris-(mixed mono- and di-nonylphenyl)phosphite or the like), phosphonates (e.g., dimethylbenzene phosphonate or the like), phosphates (e.g., trimethyl phosphate, or the like), or combinations comprising at least one of the foregoing heat stabilizers. The heat stabilizer can be tris(2,4-di-t-butylphenyl) phosphate available as IRGAPHOS™ 168. Heat stabilizers are generally used in amounts of 0.01 to 5 wt %, based on the total weight of polymer in the composition.

There is considerable overlap among plasticizers, lubricants, and mold release agents, which include, for example, glycerol tristearate (GTS), phthalic acid esters (e.g., octyl-4,5-epoxy-hexahydrophthalate), tris-(octoxycarbonylethyl) isocyanurate, tristearin, di- or polyfunctional aromatic phosphates (e.g., resorcinol tetraphenyl diphosphate (RDP), the bis(diphenyl) phosphate of hydroquinone and the bis(diphenyl) phosphate of bisphenol A); poly-alpha-olefins; epoxidized soybean oil; silicones, including silicone oils (e.g., poly(dimethyl diphenyl siloxanes); esters, for example, fatty acid esters (e.g., alkyl stearyl esters, such as, methyl stearate, stearyl stearate, and the like), waxes (e.g., beeswax, montan wax, paraffin wax, or the like), or combinations comprising at least one of the foregoing plasticizers, lubricants, and mold release agents. These are generally used in amounts of 0.01 to 5 wt %, based on the total weight of the polymer in the composition.

Light stabilizers, in particular ultraviolet light (UV) absorbing additives, also referred to as UV stabilizers, include hydroxybenzophenones (e.g., 2-hydroxy-4-n-octoxy benzophenone), hydroxybenzotriazines, cyanoacrylates, oxanilides, benzoxazinones (e.g., 2,2'-(1,4-phenylene)bis (4H-3,1-benzoxazin-4-one, commercially available under the trade name CYASORB UV-3638 from Cytec), aryl salicylates, hydroxybenzotriazoles (e.g., 2-(2-hydroxy-5-methylphenyl)benzotriazole, 2-(2-hydroxy-5-tert-octylphenyl)benzotriazole, and 2-(2H-benzotriazol-2-yl)-4-(1,1,3,3-tetramethylbutyl)-phenol, commercially available under the trade name CYASORB 5411 from Cytec) or combinations comprising at least one of the foregoing light stabilizers. The UV stabilizers can be present in an amount of 0.01 to 1 wt %, specifically, 0.1 to 0.5 wt %, and more specifically, 0.15 to 0.4 wt %, based upon the total weight of polymer in the composition.

Possible fillers or reinforcing agents include, for example, mica, clay, feldspar, quartz, quartzite, perlite, tripoli, diatomaceous earth, aluminum silicate (mullite), synthetic calcium silicate, fused silica, fumed silica, sand, boron-nitride powder, boron-silicate powder, calcium sulfate, calcium carbonates (such as chalk, limestone, marble, and synthetic precipitated calcium carbonates) talc (including fibrous, modular, needle shaped, and lamellar talc), wollastonite, hollow or solid glass spheres, silicate spheres, cenospheres, aluminosilicate or (armospheres), kaolin, whiskers of silicon carbide, alumina, boron carbide, iron, nickel, or copper, continuous and chopped carbon fibers or glass fibers, molybdenum sulfide, zinc sulfide, barium titanate, barium ferrite, barium sulfate, heavy spar, $TiO_2$, aluminum oxide, magnesium oxide, particulate or fibrous aluminum, bronze, zinc, copper, or nickel, glass flakes, flaked silicon carbide, flaked aluminum diboride, flaked aluminum, steel flakes, natural fillers such as wood flour, fibrous cellulose, cotton, sisal, jute, starch, lignin, ground nut shells, or rice grain husks, reinforcing organic fibrous fillers such as poly(ether ketone), polyimide, polybenzoxazole, poly(phenylene sulfide), polyesters, polyethylene, aromatic polyamides, aromatic polyimides, polyetherimides, polytetrafluoroethylene, and poly (vinyl alcohol), as well combinations comprising at least one of the foregoing fillers or reinforcing agents. The fillers and reinforcing agents can be coated with a layer of metallic material to facilitate conductivity, or surface treated with silanes to improve adhesion and dispersion with the polymer matrix. Fillers are used in amounts of 1 to 200 parts by weight, based on 100 parts by weight of based on 100 parts by weight of the total composition.

Antioxidant additives include organophosphites such as tris(nonyl phenyl)phosphite, tris(2,4-di-t-butylphenyl)phosphite, bis(2,4-di-t-butylphenyl)pentaerythritol diphosphite, distearyl pentaerythritol diphosphite; alkylated monophenols or polyphenols; alkylated reaction products of polyphenols with dienes, such as tetrakis[methylene(3,5-di-tert-butyl-4-hydroxyhydrocinnamate)] methane; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl) propionate; amides of beta-(3,5-di-tert-butyl-4-hydroxyphenyl)-propionic acid, or combinations comprising at least one of the foregoing antioxidants. Antioxidants are used in amounts of 0.01 to 0.1 parts by weight, based on 100 parts by weight of the total composition, excluding any filler.

Useful flame retardants include organic compounds that include phosphorus, bromine, and/or chlorine. Non-brominated and non-chlorinated phosphorus-containing flame retardants can be preferred in certain applications for regulatory reasons, for example organic phosphates and organic compounds containing phosphorus-nitrogen bonds.

Inorganic flame retardants can also be used, for example salts of $C_{1-16}$ alkyl sulfonate salts such as potassium perfluorobutane sulfonate (Rimar salt), potassium perfluorooctane sulfonate, tetraethylammonium perfluorohexane sulfonate, and potassium diphenylsulfone sulfonate; salts such as $Na_2CO_3$, $K_2CO_3$, $MgCO_3$, $CaCO_3$, and $BaCO_3$, or fluoroanion complexes such as $Li_3AlF_6$, $BaSiF_6$, $KBF_4$, $K_3AlF_6$, $KAlF_4$, $K_2SiF_6$, and/or $Na_3AlF_6$. When present, inorganic flame retardant salts are present in amounts of 0.01 to 10 parts by weight, more specifically 0.02 to 1 parts by weight, based on 100 parts by weight of the total composition, excluding any filler.

Anti-drip agents can also be used in the composition, for example a fibril forming or non-fibril forming fluoropolymer such as polytetrafluoroethylene (PTFE). The anti-drip agent can be encapsulated by a rigid copolymer, for example styrene-acrylonitrile copolymer (SAN). PTFE encapsulated in SAN is known as TSAN. A TSAN comprises 50 wt % PTFE and 50 wt % SAN, based on the total weight of the encapsulated fluoropolymer. The SAN can comprise, for example, 75 wt % styrene and 25 wt % acrylonitrile based on the total weight of the copolymer. Antidrip agents can be used in amounts of 0.1 to 10 parts by weight, based on 100 parts by weight of the total composition, excluding any filler.

The polycarbonate compositions can be manufactured by various methods known in the art. For example, powdered polycarbonate, and other optional components are first blended, optionally with any fillers, in a high speed mixer or by hand mixing. The blend is then fed into the throat of a twin-screw extruder via a hopper. Alternatively, at least one of the components can be incorporated into the composition by feeding it directly into the extruder at the throat and/or downstream through a sidestuffer, or by being compounded into a masterbatch with a desired polymer and fed into the extruder. The extruder is generally operated at a temperature higher than that necessary to cause the composition to flow. The extrudate can be immediately quenched in a water bath and pelletized. The pellets so prepared can be one-fourth inch long or less as desired. Such pellets can be used for subsequent molding, shaping, or forming.

Polymer Composition and Extrusion

Some compositions comprise polymer derived from melt extrusion of polymer derived from melt extrusion of (i) 80 to 95 wt % polycarbonate; (ii) 4.9 to 20 wt % polymethyl methacrylate; and (iii) 0.01 to 1.5 wt % of catalyst; wherein the polymer is transparent, wherein transesterification occurs with at least a portion of the polycarbonate and the polymethyl methacrylate during melt extrusion; and wherein the combined wt % value of all components does not exceed 100 wt. %, and wherein all wt % values are based on the total weight of the composition.

Certain compositions comprise comprises (i) 85 to 90 wt % polycarbonate; (ii) 9.8 to 15 wt % polymethyl methacrylate; and (iii) 0.2 to 1 wt % of catalyst.

The polymer compositions may additionally contain additives as described herein.

The polymer compositions can be formed by techniques known to those skilled in the art. Extrusion and mixing techniques, for example, may be utilized to combine the components of the polymer composition.

Extruding may be performed using a twin screw extruder. Some extrusions are performed at 230° C. to 300° C. It is preferred that the extruder has a plurality of heated zones whose temperature can be profiled within the temperatures described above. In some processes, melt extrusion utilizes a screw extruder of at least 75 rpm or at least 100 rpm.

It is preferred that at least a portion of the polycarbonate and the polymethyl methacrylate transesterify during melt extrusion. It is further preferred that over 50 mole percent, or over 75 mole percent or over 90 mole percent or approximately 100 mole percent of the PMMA transesterifies with PC.

Articles of Manufacture

In one aspect, the present disclosure pertains to shaped, formed, or molded articles comprising the compositions described herein. The compositions can be molded into useful shaped articles by a variety of means such as injection molding, extrusion, rotational molding, blow molding and thermoforming to form articles. The compositions described herein can also be made into film and sheet as well as components of laminate systems. In a further aspect, a method of manufacturing an article comprises melt blending the polycarbonate component, polymethyl methacrylate, catalyst and any optional components; and molding the extruded composition into an article. In a still further aspect, the extruding is done with a twin-screw extruder.

In a further aspect, the article comprising the disclosed copolymer compositions is used in automotive applications. In a still further aspect, the article can be selected from computer and business machine housings such as housings for monitors, handheld electronic device housings such as housings for cell phones, electrical connectors, medical devices, membrane devices, and components of lighting fixtures, ornaments, home appliances, roofs, greenhouses, sun rooms, swimming pool enclosures, and the like. Other representative articles that may be fabricated using the disclosed copolymer compositions provided herein include headlamp bezels, headlamps, tail lamps, tail lamp housings, tail lamp bezels, license plate enclosures, enclosures for electrical and telecommunication devices, building and construction applications such as glazing, roofs, windows, floors, decorative window furnishings or treatments; treated glass covers for pictures, paintings, posters, and like display items; optical lenses; ophthalmic lenses; corrective ophthalmic lenses; implantable ophthalmic lenses; wall panels, and doors; protected graphics; outdoor and indoor signs; enclosures, housings, panels, and parts for automatic teller machines (ATM); enclosures, computer housings; desk-top computer housings; portable computer housings; lap-top computer housings; palm-held computer housings; monitor housings; printer housings; keyboards; FAX machine housings; copier housings; telephone housings; mobile phone housings; radio sender housings; radio receiver housings; light fixtures; lighting appliances; network interface device housings; and like applications. In a still further aspect, the article used in automotive applications is selected from instrument panels, overhead consoles, interior trim, center consoles, headlamp bezels, headlamps, tail lamps, tail lamp housings, tail lamp bezels, license plate enclosures, steering wheels, radio speaker grilles, mirror housings, grille opening reinforcements, steps, hatch covers, knobs, buttons, and levers. Additional fabrication operations may be performed on articles, such as, but not limited to molding, in-mold decoration, baking in a paint oven, lamination, and/or thermoforming.

In various aspects, the article comprising the disclosed copolymer compositions are suitable for use in applications such as transparent keypads for mobile phones, where customers require the possibility to form these films at low temperatures (below 100° C.) and further require an improved punch ductility and chemical resistance. Other typical such articles are automotive trim, automotive interior parts, portable telecommunications and appliance fronts. In a further aspect, wherein the article is a film, it can further comprise visual effects pigments (such as coated Al and glass flakes. In a still further aspect, the article is a film comprising a disclosed copolymer composition can be used in direct film applications but also in processes like IMD (In Mould Decoration). In an even further aspect, the article comprising a disclosed copolymer composition is used in lighting applications including automotive headlamp lenses, covers and lenses for other optical devices, as well as transparent films and sheets. The article can also be used in a wide variety of molded products such as medical devices, radio and TV bezels, mobile phone keypads, notebook computer housings and keys, optical display films, automotive parts, and other electronic and consumer products.

EXAMPLES

The disclosure is illustrated by the following non-limiting examples. Unless otherwise stated to the contrary herein, all test standards are the most recent standard in effect at the time of filling this application.

Materials

Bisphenol A (BPA) PC was used with two different end cap content (different concentration of OH pendant groups), $KNaH_2PO_4$ was used as catalyst and no quencher was added at the end of the reaction. Specifications are summarized in Table 1.

TABLE 1

| Specifications of PC | | | |
|---|---|---|---|
| Grade | Mw (PS) | Fries (ppm) | % End cap |
| Standard 102L | 59,000 | 1,000 | 65 |
| Low EC 102L | 59,000 | 1,700 | 48 |

PMMA was supplied by Lucite and LG (Table 2).

TABLE 2

| PMMA grades | |
|---|---|
| Grade | Mw (PS) |
| Lucite | 95,000 |
| IG840 LG | 112,000 |
| EH910 LG | 143,000 |

Catalysts were purchased from Sigma Aldrich: Tin(II) 2-ethylexanoate $(Sn(oct)_2)$, Cerium acetate (III) $(CeAc_3)$, Zinc acetate (II) $(ZnAC_2)$, Sodium stannate trihydrate $(Na_2SnO_3 \cdot 3H_2O)$.

Possible transesterification inhibitors include one or more of the following:

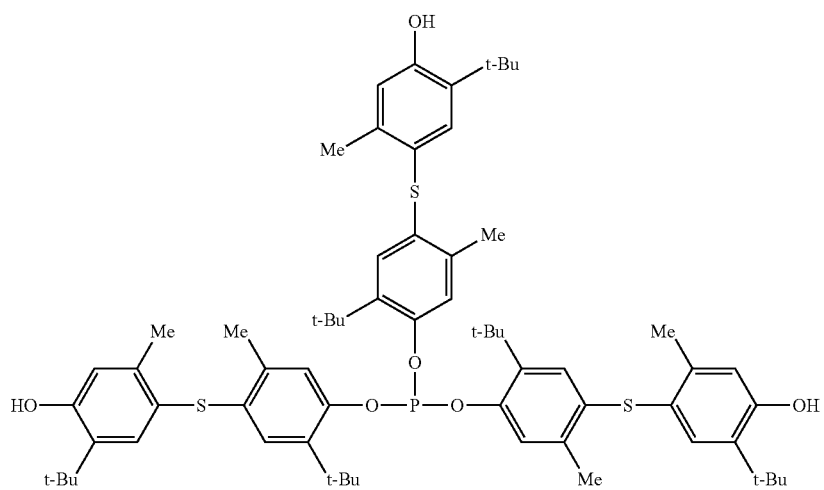 [SMILES: Cc1cc(O)c(C(C)(C)C)cc1Sc1cc(C(C)(C)C)c(OP(Oc2cc(C)c(Sc3cc(C(C)(C)C)c(O)cc3C)cc2C(C)(C)C)Oc2cc(C)c(Sc3cc(C(C)(C)C)c(O)cc3C)cc2C(C)(C)C)cc1C]

Hostanox OSP1=tris [2-tert-butyl-4-thio (2'-methyl-4'-hydroxy-5'-tert-butyl)-phenyl-5-methyl] phenylphosphate;

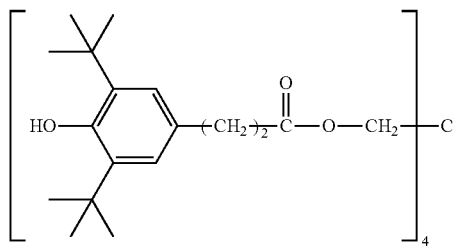

Irganox 1010=pentaerythritol tetrakis(3-(3,5-di-tert-butyl-4-hydroxyphenyl)propionate); and

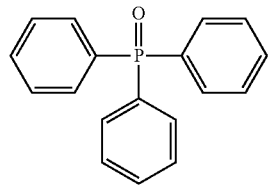 [SMILES: O=P(c1ccccc1)(c1ccccc1)c1ccccc1]

TPPO=triphenylphosphine oxide.

Possible chain extenders include one or more of the following:

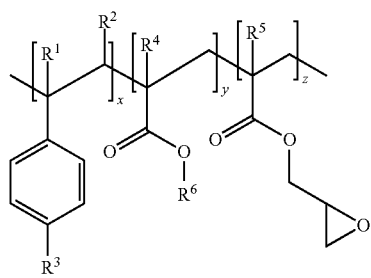

Joncryl=epoxy functional oligomeric acrylic.

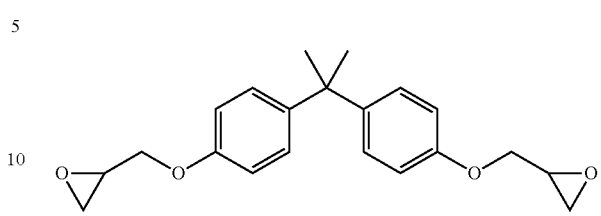

DGEBA=diglycidyl ether bisphenol A.

Chain extenders are di/tri-functional products that can link polymer chains during processing though final reactive groups, like pendant OH in PC, rising the molecular weight.

Sample Preparation Devices

A DSM Xplore micro-compounder, with capacity of 5 cubic centimeters (cc) was used for producing small samples. A Collin extruder (6 barrels, L/D=30) was used to generate the blends.

Testing

Molecular weight was measured in PS units. Pencil test was performed under ASTM D3363, applying 300 gram (g) weight, and ASTM 785 was used to determine Rockwell hardness. Izod tests (unnotched and 2.54 millimeter (mm) notched) were performed under ASTM 256.

Examples 1-13

Experiments using various PC types and catalysts were blended in a micro-compounder (DSM Xplore micro-compounders) varying residence time, screw rotation and temperature. Materials and conditions tested are summarized in Table 3. As an indicator of miscibility, transparency of the produced specimens was used to select the suitable catalyst and PC.

TABLE 3

Samples blended in the microcompounder

| Ex. | PC (wt %) | PMMA (wt %) | Catalyst (wt %) | T (° C.) | RPM | t (min) |
|---|---|---|---|---|---|---|
| E1 | Low EC (90) | Lucite (10) | ZnAc$_2$ (1) | 260 | 200 | 10 |
| E2 | Low EC (90) | Lucite (10) | ZnAc$_2$ (0.5) | 260 | 200 | 10 |
| E3 | Low EC (90) | Lucite (10) | ZnAc$_2$ (0.5) | 250 | 400 | 10 |
| E4 | Low EC (90) | Lucite (10) | ZnAc$_2$ (0.5) | 250 | 400 | 5 |
| E5 | Low EC (90) | Lucite (10) | ZnAc$_2$ (0.75) | 250 | 400 | 10 |
| E6 | Standard 102L | Lucite (10) | ZnAc$_2$ (0.5) | 250 | 400 | 10 |
| E7 | Low EC (90) | Lucite (10) | Na$_2$SnO$_3$•3H$_2$O (0.5) | 260 | 100 | 10 |
| E8 | Low EC (90) | Lucite (10) | Na$_2$SnO$_3$•3H$_2$O (1) | 260 | 100 | 10 |
| E9 | Low EC (85) | Lucite (15) | Na$_2$SnO$_3$•3H$_2$O (1) | 260 | 100 | 10 |
| E10 | Low EC (85) | Lucite (15) | Na$_2$SnO$_3$•3H$_2$O (1.5) | 280 | 100 | 10 |
| E11 | Low EC (90) | Lucite (10) | CeAc$_3$ (0.5) | 255 | 100 | 10 |
| E12 | Low EC (90) | Lucite (10) | CeAc$_3$ (0.25) | 255 | 100 | 10 |
| E13 | Low EC (90) | Lucite (10) | CeAc$_3$ (0.5) | 255 | 100 | 5 |

Low EC (90) is Low EC 102L at 90 wt % of the polymer

Blends (no catalyst added) detailed in the table below were observed for transparency. Polymers used were PC 102L and PC with low EC. PC/PMMA was blended in a microcompounder for 10 min with no catalyst. Blends 3 and 4 were hazy compared to polymers 1 and 2.

TABLE 4

| | |
|---|---|
| 1 | Standard 102L |
| 2 | Low EC 102L |
| 3 | Standard 102L/PMMA 90/10 |
| 4 | Low EC 102L/PMMA 90/10 |

Different catalysts were tested as shown in Tables 5-7 below. Various amounts of $ZnAc_2$ catalyst were added and clear PC/PMMA blends were obtained. Use of $Na_2SnO_3$ as catalyst also provided clear samples, but it was not completely soluble in the blend and small crystals were observed. Finally, $CeAc_3$ catalyst gave a blend having a dark color. Considering the above, $ZnAc_2$ was selected because a clear blend could be obtained and color provided by the catalyst can be acceptable. As well, there is no significant difference between the types of PC, therefore the standard was selected.

TABLE 5

| Sample | PC | $ZnAc_2$Cat (%) | T (° C.) | RPM | t (min) |
|---|---|---|---|---|---|
| E1 | Low EC | 1 | 260 | 200 | 10 |
| E2 | Low EC | 0.5 | 260 | 200 | 10 |
| E3 | Low EC | 0.5 | 250 | 400 | 10 |
| E4 | Low EC | 0.5 | 250 | 400 | 5 |
| E5 | Low EC | 0.75 | 250 | 400 | 10 |
| E6 | Standard 102L | 0.5 | 250 | 400 | 10 |

TABLE 6

| Sample | PC/PMMA | $Na_2SnO_3$Cat (%) | T (° C.) | RPM | t (min) |
|---|---|---|---|---|---|
| E7 | 90/10 | 0.5 | 260 | 100 | 10 |
| E8 | 90/10 | 1 | 260 | 100 | 10 |
| E9 | 85/15 | 1 | 260 | 100 | 10 |
| E10 | 85/15 | 1.5 | 280 | 100 | 10 |

TABLE 7

| Sample | $CeAc_3$ Catalyst (%) | T (° C.) | RPM | t (min) |
|---|---|---|---|---|
| E11 | 0.5 | 255 | 100 | 10 |
| E12 | 0.25 | 255 | 100 | 10 |
| E13 | 0.5 | 255 | 100 | 5 |

Examples 14-16

Selection of PMMA during reactive extrusion. The resin will be selected based on the transparency achieved in the blend. Conditions of the experiments are summarized in Table 8.

TABLE 8

Selection of PMMA

| Example | PMMA (%) | PC | $ZnAc_2$ (%) | T (° C.) | Rpm |
|---|---|---|---|---|---|
| E14 | IG840 LG (10) | 102L Standard | 1 | 260 | 100 |
| E15 | Lucite (10) | 102L Standard | 1 | 260 | 100 |
| E16 | EH910 LG (10) | 102L Standard | 1 | 260 | 100 |

The extruder has two automatic feeders, one was used to feed the resins, the other for the catalyst. PC and PMMA were fed at the first barrel of the extruder. The catalyst was introduced in the third barrel, on the melted polymers, which favored its dispersion. The extruder was set at 260° C. and 100 rpm. Finally, samples were injection molded at 250° C. for testing.

After blending the three grades of PMMA with PC and 1 wt % of $ZnAc_2$, PMMA EH910 from LG with Mw=146000 g/mol was selected, because it provided samples with better appearance. The difference in Mw between the two polymers seems to benefit the dispersion.

Comparative Examples 1-5

Comparative examples correspond to the pure resins, PC (Standard) and PMMA (EH910LG), and the blends with no catalyst. Properties of the physical blends were determined as reference. Extrusion conditions in the physical blends were 100 rpm and 260° C. Samples were injection molded at 250° C. for testing.

The properties of these samples are summarized in 9. The addition of PMMA already produces an increase in scratch resistance, the property we want to improve, although the non compatibilized samples are opaque (C3-C5).

TABLE 9

Comparative examples

| | | | | Rockwell | | Pencil Test | Transmittance (%) | | | |
|---|---|---|---|---|---|---|---|---|---|---|
| Example | PC/PMMA | % $ZnAc_2$ | Extrusion | M | stdev | 300 g | 620 nm | stdev | 800 nm | stdev |
| C1 | 0/100 | — | 1 | 87 | 0 | 2H | 89.47 | 0.57 | 89.83 | 0.29 |
| C2 | 100/0 | — | 1 | 36 | 1 | 5B | 88.7 | 1.17 | 89.83 | 0.29 |
| C3 | 90/10 | — | 1 | 51 | 1 | B | — | — | — | — |
| C4 | 85/15 | — | 1 | 56 | 1 | B | — | — | — | — |
| C5 | 80/20 | — | 1 | 57 | 1 | B | — | — | — | — |

Examples 17-22

PC (Standard)/PMMA (EH910 LG) blends with high catalyst content (0.10-0.25 wt % of $ZnAc_2$) were prepared. Reactive blending was performed to enhance the transparency of the blend by improving the compatibility between the polymers through transesterification reaction.

The catalyst was first introduced in the PMMA resin by extrusion, the PMMA was introduced in the first barrel and the catalyst in the third. This PMMA containing the $ZnAc_2$ was then extruded with the appropriate amount of fresh PC to get samples with 10 and 15 wt % of PMMA. The extruder was set at 250° C. and 100 rpm. Samples were injection molded at 250° C. for testing.

Results are summarized in Table 10. Clear samples were obtained by reactive blending (examples 17-22). As mentioned above, optical transparency and impact resistance are sensitive to the reactive processing. High reaction progress leads to clear samples, which is detrimental for PC properties, because the ester exchange dramatically reduces the weight average molecular weight of PC. In this case, the Mw dropped to around 30,000 g/mol, from the initial 59,000 g/mol of PC.

Reactive blending produced an enhancement of the transparency by polymer compatibilization. Samples with 10 wt % of PMMA and contents of 0.15 and 0.10 wt % of $ZnAc_2$ (E19 and E21) had the highest transmittance. Moreover, the scratch resistance was B for both 10 and 15 wt %, therefore increasing the PMMA content did not produce any enhancement in the scratch.

TABLE 10

Examples 17-22

| Example | PC/PMMA | % $ZnAc_2$ | Rockwell M | stdev | Pencil Test 300 g | Mw g/mol | Transmittance (%) 620 nm | stdev | 800 nm | stdev |
|---|---|---|---|---|---|---|---|---|---|---|
| E17 | 90/10 | 0.25 | 57 | 1 |   |   | 44.80 | 2.51 | 75.05 | 2.40 |
| E18 | 90/10 | 0.20 | 55 | 1 | B |   | 61.69 | 4.82 | 76.44 | 3.03 |
| E19 | 90/10 | 0.15 | 55 | 1 | B |   | 73.67 | 3.29 | 89.81 | 1.59 |
| E20 | 85/15 | 0.23 | 59 | 1 | B |   | 37.05 | 6.3 | 60.37 | 5.2 |
| E21 | 90/10 | 0.10 | 54 | 1 | B | 37397 | 72.17 | 4.95 | 87.44 | 3.07 |
| E22 | 85/15 | 0.15 | 59 | 1 | B |   | 28.52 | 2.49 | 56.77 | 5.62 |

Examples 23-24

Optimization of the reactive blending. Under acceptable mixing conditions, residence time and temperature appeared to be more critical than shear for transparency and properties. Catalyst content is also important. Therefore, these factors were investigated:

Residence time was increased by re-extrusion.

A profile temperature was set for the first extrusion, instead of a uniform temperature in the extruder.

Since residence time is increased, the content on catalyst is reduced to 0.01, 0.02 and 0.03 wt %. In this case, catalyst is added with the PC (Standard) and PMMA (EH910LG) resins in the first barrel.

In the examples, PMMA content is limited to 10 wt %.

After different trials, the extrusion conditions for samples 23-25 were:

First extrusion: profile T=250-245-242-238-235-235° C., 100 rpm

Second extrusion: T=235° C., 100 rpm

Injection molding: T=240° C.

Results are summarized in Table 11. Longer mixing times and lower catalyst contents produced samples with high transparency and acceptable Mw. Pencil test remained in B and Rockwell test gave slightly better values than examples E17-E19 and E21.

TABLE 11

Examples 23-24

| Example | PC/PMMA | $ZnAc_2$ (%) | Pencil Test 300 g | Rockwell M | Mw g/mol | T 620 nm (%) |
|---|---|---|---|---|---|---|
| E23 | 90/10 | 0.01 | B | 59 | 40809 | 68 |
| E24 | 90/10 | 0.02 | B | 57 | 31986 | 82 |

The presence of PMMA improves Rockwell M, already by physical blending. It is noticeable that, for the non compatibilized blends, there was increase in Rockwell from 9.8 to 15 wt % of PMMA, but there was no change with 20 wt % (FIG. 1). Compared to the physical mixing, the reactive blends presented higher increase on Rockwell at the same PMMA concentration (FIG. 1).

Examples 25-29

The ester exchange during reactive blending produces a decrease in the molecular weight of PC, which becomes a problem to keep the PC properties, especially impact. Therefore, an effort to recover it has been done by using transesterification inhibitors and chain extenders.

Figure 2:
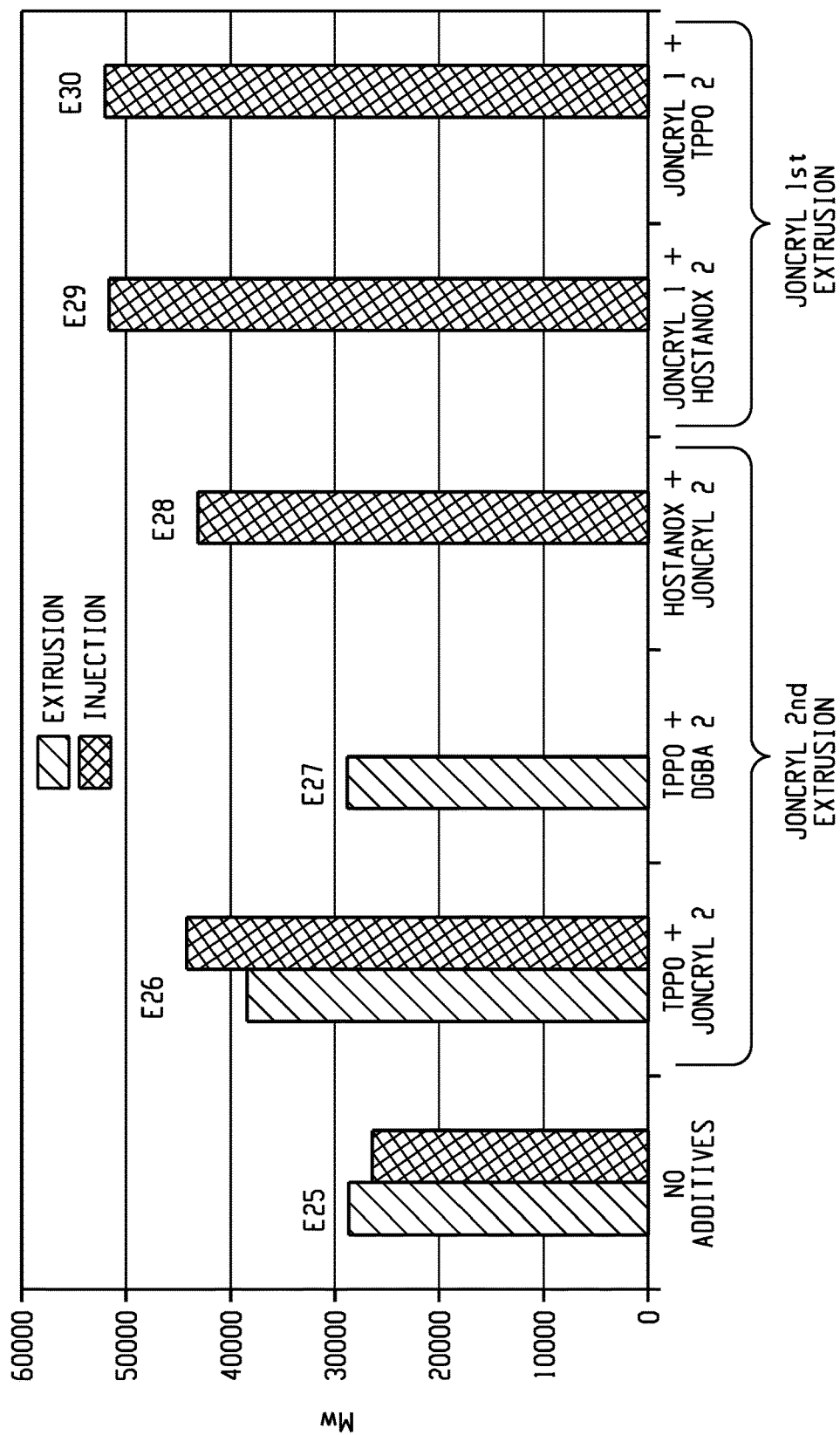
FIG. 2 shows the increase in Mw using chain extender.

Conditions were the same as in examples 23-25, with the addition of the catalyst in the first barrel. Inhibitor and chain extender were introduced in the first or the second extrusion as showed in Table 12. Chain extenders, in particular Joncryl, produced the expected increase in Mw (FIG. 2, Table 12).

ppm in PC/PMMA reactive blend. $^{13}$C NMR shows additional peaks for the quaternary PC carbon at 149 ppm in the PC/PMMA reactive blends due to the interaction between PC and PMMA.

PC/PMMA with no compatibilization (no ester exchange reaction) is opaque due to the lack of compatibility between PC and PMMA and the different refraction index. The size of the dispersed phase is not small enough to achieve transparency. PC/PMMA reactive blends are transparent. The domain size of the dispersed phase (PMMA) is decreased due to the reaction between the polymers.

TABLE 13

| | Changes in Mw | |
|---|---|---|
| PC/PMMA | % ZnAc$_2$ | Mw (g/mol) |
| PC (Standard) | — | 59000 |
| 90/10 | — | 57435 |
| 90/10 | 0.1 | 37397 |

Aspects

The present disclosure comprises at least the following aspects.

TABLE 12

Samples extruded with transesterification inhibitor and chain extender

| Example | PC/PMMA | ZnAc$_2$ (%) | Inhibitor (%) | Chain extender (%) | pellets/sheet | Mw | Fries | T 620 nm (%) |
|---|---|---|---|---|---|---|---|---|
| E25 | 90/10 | 0.25 | — | — | pellets | 28720 | 1406 | |
| | | | | | sheet | 26505 | 1423 | |
| E26 | 90/10 | 0.25 | TPPO (1) 2$^{nd}$ extr | Joncryl (0.5) 2$^{nd}$ ext | pellets | 38799 | 1364 | |
| | | | | | sheet | 44108 | 1300 | |
| E27 | 90/10 | 0.25 | TPPO (1) 2$^{nd}$ extr | DGBA (0.25) 2$^{nd}$ ext | pellets | 29339 | 1356 | |
| E28 | 90/10 | 0.25 | Hostanox (0.5) 2$^{nd}$ extr | Joncryl (0.5) 2$^{nd}$ ext | sheet | 43128 | 1344 | |
| E29 | 90/10 | 0.25 | Hostanox (0.5) 2$^{nd}$ extr | Joncryl (0.5) 1$^{st}$ ext | sheet | 51578 | 1292 | |
| E30 | 90/10 | 0.25 | TPPO (1) 2$^{nd}$ extr | Joncryl (0.5) 1$^{st}$ ext | sheet | 52101 | 1314 | |
| E31 | 90/10 | 0.01 | TPPO (2) 2$^{nd}$ ext | — | sheet | 29950 | 1354 | 82 |

Example 30

Experiments with PC/PMMA blends show a decrease in Mw with reactive blends and an increase in OH endgroup concentration. $^1$H NMR shows an increase in OH concentration: from 961 ppm in PC/PMMA physical blend to 2800

Aspect 1. An article comprising a polymer derived from melt extrusion of:

(i) 80 to 95 wt % polycarbonate; said polycarbonate having and endcap level of 45% to 80%, and a branching level of 300-5,000 ppm comprising the following branching structures:

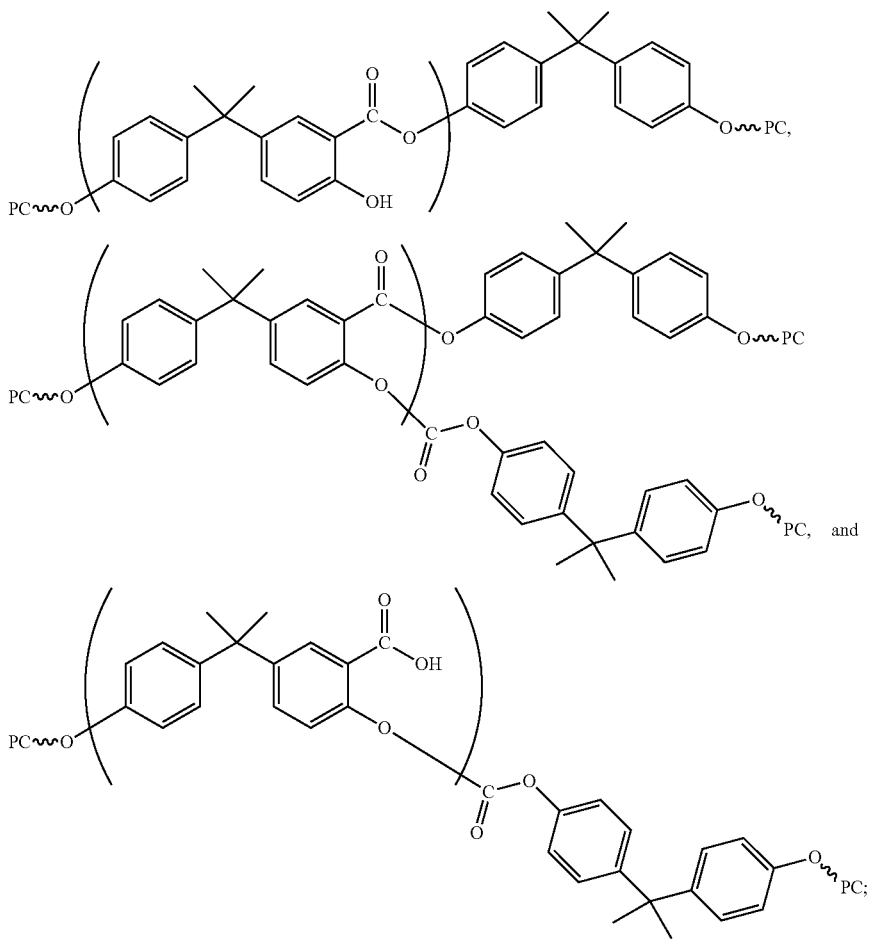

(ii) 4.9 to 20 wt % polymethyl methacrylate; and (iii) 0.1 to 1.5 wt % of catalyst; wherein said polymer is transparent, wherein transesterification occurs with at least a portion of the polycarbonate and the polymethyl methacrylate during melt extrusion to produce a transesterification polymer; and wherein the combined wt % value of all components does not exceed 100 wt. %, and wherein all wt % values are based on the total weight of the composition.

Aspect 2. The article of Aspect 1, wherein the polycarbonate has a molecular weight (Mw) of 20,000 to 120,000 Dalton on a polystyrene basis.

Aspect 3. The article of Aspect 1 or Aspect 2, wherein at least a portion of the polymethyl methacrylate is incorporated into the backbone of the transesterification polymer.

Aspect 4. The article of anyone of Aspects 1-3, wherein the polycarbonate comprises at least 900 ppm of hydroxide groups.

Aspect 5. The article of any one of Aspects 1-4, wherein the polymer comprises (i) 85 to 90 wt % polycarbonate; (ii) 9.8 to 15 wt % polymethyl methacrylate; and (iii) 0.2 to 1 wt % of catalyst; wherein the combined wt % value of all components does not exceed 100 wt. %, and wherein all wt % values are based on the total weight of the composition.

Aspect 6. The article of any one of Aspects 1-5, wherein the catalyst comprises Zn.

Aspect 7. The article of any one of Aspects 1-6, wherein the catalyst is zinc acetate.

Aspect 8. The article of any one of Aspects 1-7, wherein the polycarbonate is derived from the melt polymerization of bisphenol A with diphenyl carbonate.

Aspect 8. A method of forming an article comprising: (i) 80 to 95 wt % polycarbonate; said polycarbonate having and endcap level of 45% to 80%, the polycarbonate having a molecular weight (Mw) of 20,000 to 120,000 Dalton on a polystyrene basis and branching level of 300-5,000 ppm comprising the following branching structures:

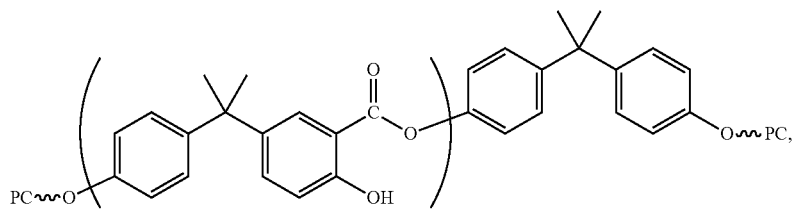

-continued

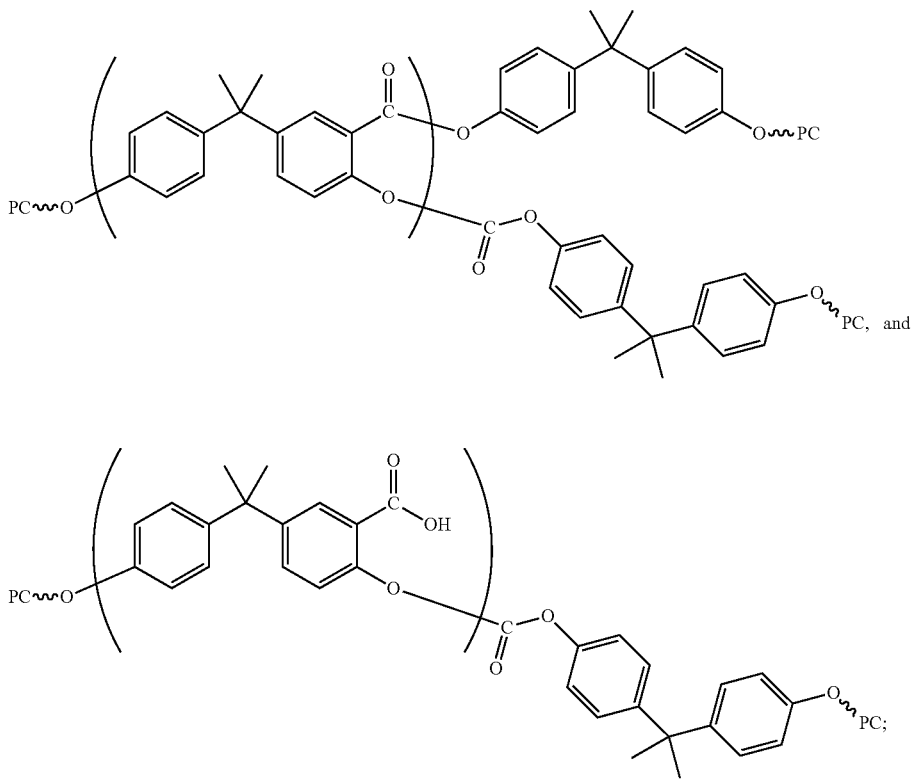

(ii) 4.9 to 20 wt % polymethyl methacrylate; and (iii) 0.1 to 1.5 wt % of catalyst to produce a transparent polymer blend; wherein said polymer is transparent, wherein transesterification occurs with at least a portion of the polycarbonate and the polymethyl methacrylate during melt extrusion; and wherein the combined wt % value of all components does not exceed 100 wt. %, and wherein all wt % values are based on the total weight of the composition and (b) molding the polymer blend into said article.

Aspect 10. The method of Aspect 9, wherein the molding comprises compression or injection molding.

Aspect 11. The method of c Aspect 9 or Aspect 10, wherein said melt extrusion utilizes a screw extruder of at least 75 rpm.

Aspect 12. The method of any one of Aspects 9-11, wherein the extruder temperature was 230° C. to 300° C.

Aspect 13. The method of any one of Aspects 9-12, wherein the polymer comprises (i) 80 to 95 wt % polycarbonate; (ii) 4.9 to 20 wt % polymethyl methacrylate; and (iii) 0.2 to 1 wt % of catalyst; wherein the combined wt % value of all components does not exceed 100 wt. %, and wherein all wt % values are based on the total weight of the composition.

Aspect 14. The method of any one of Aspects 9-13, wherein the polycarbonate comprises at least 200 ppm of hydroxide groups.

Aspect 15. The method of any one of Aspects 9-14, where in the article is a graphical display or optical display, such as a bezel of a television.

Aspect 16. A method for forming a transparent polymer blend comprising melt extrusion of (i) 80 to 95 wt % polycarbonate; said polycarbonate having and endcap level of 45% to 80%, the polycarbonate having a molecular weight (Mw) of 20,000 to 120,000 Dalton on a polystyrene basis and branching level of 300-5,000 ppm comprising the following branching structures:

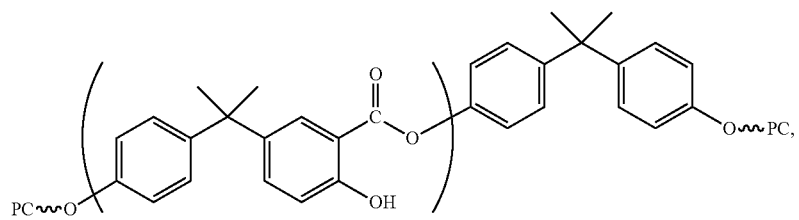

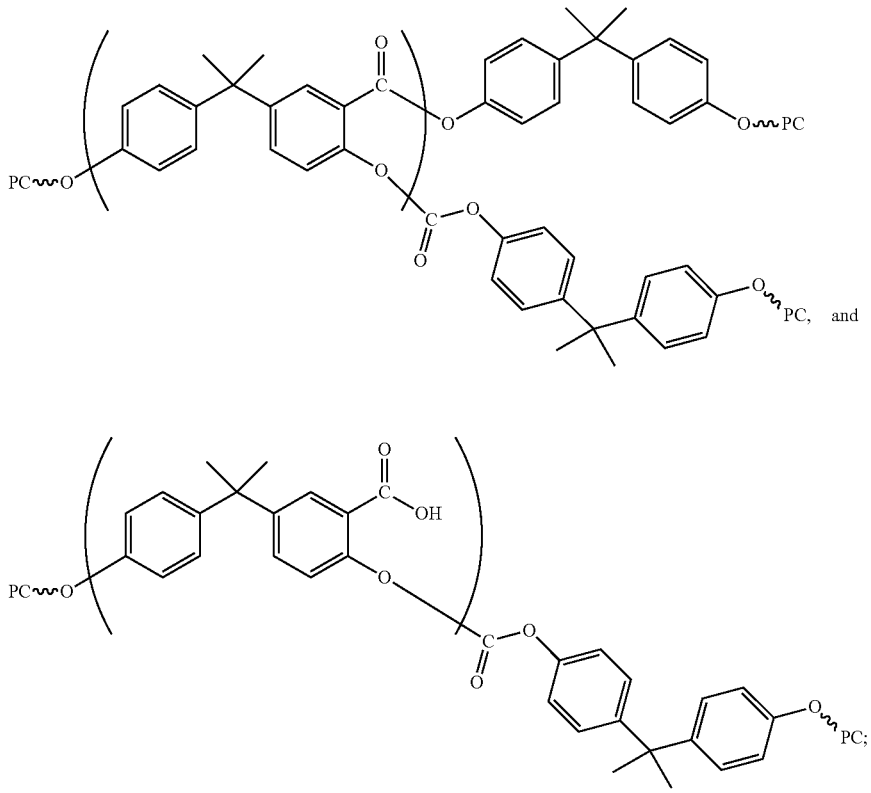

(ii) 4.9 to 20 wt % polymethyl methacrylate; and (iii) 0.1 to 1.5 wt % of catalyst; wherein transesterification occurs with at least a portion of the polycarbonate and the polymethyl methacrylate during melt extrusion; and wherein the combined wt % value of all components does not exceed 100 wt. %, and wherein all wt % values are based on the total weight of the composition.

Aspect 17. The method of Aspect 16, wherein said melt extrusion utilizes a screw extruder of at least 75 rpm.

Aspect 18. The method of Aspect 16 or Aspect 17, wherein the extruder temperature was 230° C. to 300° C.

Aspect 19. The method of any one of Aspects 16-18, wherein the polycarbonate comprises at least 200 ppm of hydroxide groups.

Aspect 20. The method of any one of Aspects 16-19, wherein the polymer additionally comprises one or more of a flame retardant, anti-drip agent, antioxidant, antistatic agent, chain extender, colorant, de-molding agent, dye, flow promoter, flow modifier, light stabilizer, lubricant, mold release agent, pigment, quenching agent, thermal stabilizer, UV absorbent substance, UV reflectant substance, and UV stabilizer.

Aspect 21. A polymer blend comprising a polymer derived from melt extrusion of
(i) 80 to 95 wt % polycarbonate; said polycarbonate having and endcap level of 45% to 80% and a branching level of 300-5,000 ppm comprising the following branching structures:

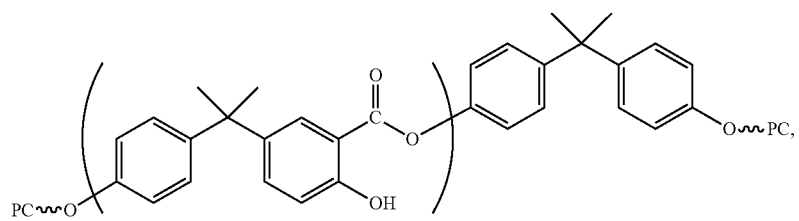

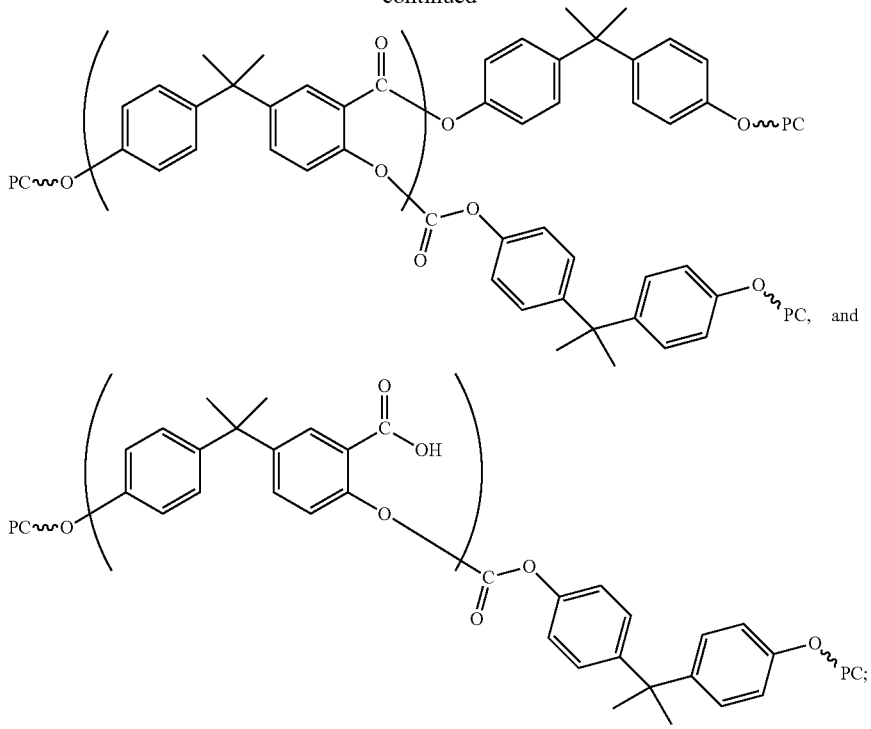

(ii) 4.9 to 20 wt % polymethyl methacrylate; and
(iii) 0.1 to 1.5 wt % of catalyst;
wherein said polymer is transparent,
wherein transesterification occurs with at least a portion of the polycarbonate and the polymethyl methacrylate during melt extrusion to produce a transesterification polymer; and
wherein the combined wt % value of all components does not exceed 100 wt. %, and wherein all wt % values are based on the total weight of the composition.

Aspect 22. The polymer blend of Aspect 21, wherein the polycarbonate having a molecular weight (Mw) of 20,000 to 120,000 Dalton on a polystyrene basis Aspect 23. The polymer blend of Aspect 21, wherein at least a portion of the polymethyl methacrylate is reacted with at least a portion of the polycarbonate and inserted into the backbone of the transesterification polymer.

Aspect 24. The polymer blend of Aspect 21, wherein the polycarbonate comprises at least 200 ppm of hydroxide groups.

Aspect 25. The polymer blend of any one of Aspects 21-24, wherein the polymer comprises
(i) 85 to 90 wt % polycarbonate;
(ii) 9.8 to 15 wt % polymethyl methacrylate; and
(iii) 0.2 to 1 wt % of catalyst;
wherein the combined wt % value of all components does not exceed 100 wt. %, and wherein all wt % values are based on the total weight of the composition.

Aspect 26. The polymer blend of any one of Aspects 1-5, wherein the catalyst comprises Zn, Sn, or Ag.

Aspect 27. The polymer blend of any one of Aspects 1-5, wherein the catalyst is zinc acetate.

Aspect 28. The polymer blend of any one of Aspects 1-7, wherein the polycarbonate is derived from the melt polymerization of bisphenol A with diphenyl carbonate.

Definitions

It is to be understood that the terminology used herein is for the purpose of describing particular aspects only and is not intended to be limiting. As used in the specification and in the claims, the term "comprising" can include the embodiments "consisting of" and "consisting essentially of." Unless defined otherwise, all technical and scientific terms used herein have the same meaning as commonly understood by one of ordinary skill in the art to which this disclosure belongs. In this specification and in the claims which follow, reference will be made to a number of terms which shall be defined herein.

As used in the specification and the appended claims, the singular forms "a," "an" and "the" include plural equivalents unless the context clearly dictates otherwise. Thus, for example, reference to "a polycarbonate polymer" includes mixtures of two or more polycarbonate polymers.

As used herein, the term "combination" is inclusive of blends, mixtures, alloys, reaction products, and the like.

Ranges can be expressed herein as from one particular value to another particular value. When such a range is expressed, another aspect includes from the one particular value and/or to the other particular value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "about" and "at or" mean that the amount or value in question can be the value designated some other value approximately or the same. It is generally understood, as used herein, that it is the nominal value indicated ±5% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

Disclosed are the components to be used to prepare the compositions of the disclosure as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B—F, C-D, C-E, and C—F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the disclosure. Thus, if there are a variety of additional steps that can be performed it is understood that each of these additional steps can be performed with any specific aspect or combination of aspects of the methods of the disclosure.

References in the specification and concluding claims to parts by weight, of a particular element or component in a composition or article, denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

As used herein the terms "weight percent," "weight %," and "wt. %" of a component, which can be used interchangeably, unless specifically stated to the contrary, are based on the total weight of the formulation or composition in which the component is included. For example if a particular element or component in a composition or article is said to have 8% by weight, it is understood that this percentage is relative to a total compositional percentage of 100% by weight.

As used herein, the term "transparent" means that the level of transmittance for a disclosed composition is greater than 50%. It is preferred that the transmittance can be at least 60%, 70%, 80%, 85%, 90%, or 95%, or any range of transmittance values derived from the above exemplified values. In the definition of "transparent", the term "transmittance" refers to the amount of incident light that passes through a sample measured in accordance with ASTM D1003 at a thickness of 3.2 millimeters.

Unless specifically stated otherwise, as used herein, all standards, e.g., test standards such as ASTM, are last version published as of May 28, 2015.

The term "transesterification" is intended to include mechanisms of reaction that can occur between ester, alcohol and acid groups such as ester exchange and condensation reactions.

The term "end cap level" or "endcap level" refers to the mole percent of the hydroxy end groups of the polycarbonate polymer chain. An endcap level of 70% means that 70 mol % of the hydroxy end groups of the polycarbonate polymer, chain are capped with an endcapping agent.

As used herein, the terms "weight average molecular weight" or "Mw" can be used interchangeably, and are defined by the formula:

$$M_w = \frac{\sum N_i M_i^2}{\sum N_i M_i},$$

where Mi is the molecular weight of a chain and Ni is the number of chains of that molecular weight. Mw can be determined for polymers, e.g. polycarbonate polymers, by methods well known to a person having ordinary skill in the art using molecular weight standards, e.g. polycarbonate standards or polystyrene standards, preferably certified or traceable molecular weight standards. Polystyrene basis refers to measurements using a polystyrene standard.

What is claimed:

1. A polymer blend comprising a polymer derived from melt extrusion of
   (i) 80 to 95 wt % polycarbonate; said polycarbonate having and endcap level of 45% to 80% and a branching level of 300-5,000 ppm comprising the following branching structures:

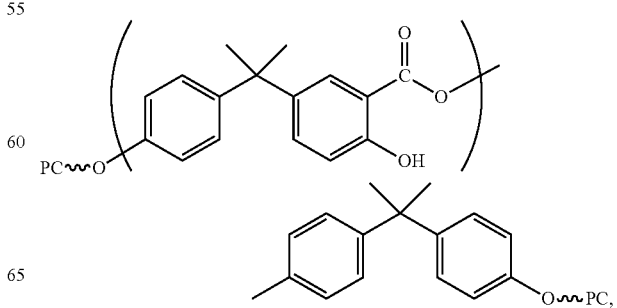

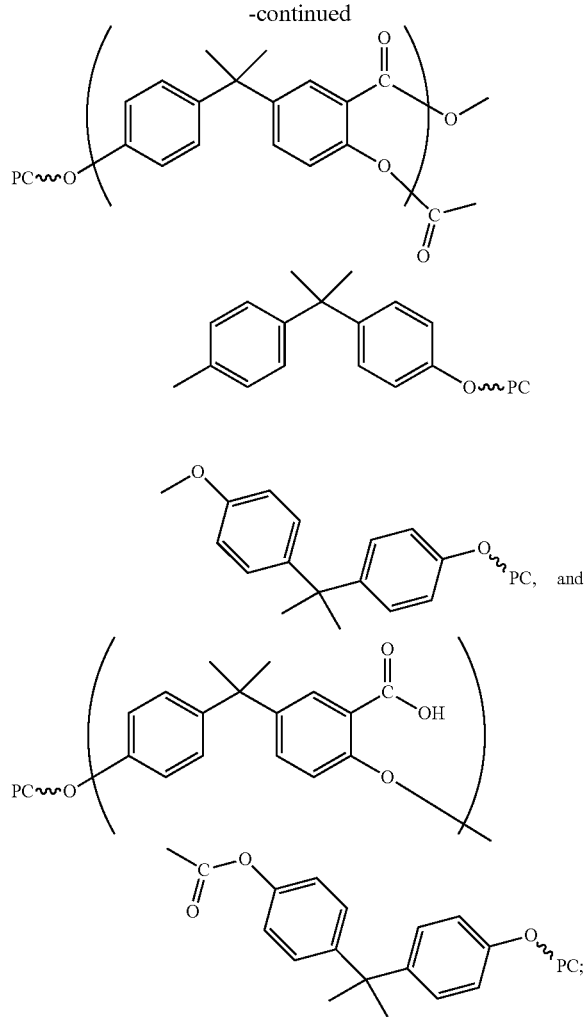

(ii) 4.9 to 20 wt % polymethyl methacrylate; and
(iii) 0.1 to 1.5 wt % of catalyst;
wherein said polymer is transparent,
wherein transesterification occurs with at least a portion of the polycarbonate and the polymethyl methacrylate during melt extrusion to produce a transesterification polymer; and
wherein the combined wt % value of all components does not exceed 100 wt. %, and wherein all wt % values are based on the total weight of the composition.

2. The polymer blend of claim 1, wherein the polycarbonate having a molecular weight (Mw) of 20,000 to 120,000 Dalton on a polystyrene basis.

3. The polymer blend of claim 1, wherein at least a portion of the polymethyl methacrylate is reacted with at least a portion of the polycarbonate and inserted into the backbone of the transesterification polymer.

4. The polymer blend of claim 1, wherein the polycarbonate comprises at least 200 ppm of hydroxide groups.

5. The polymer blend of claim 1, wherein the polymer comprises
(i) 85 to 90 wt % polycarbonate;
(ii) 9.8 to 15 wt % polymethyl methacrylate; and
(iii) 0.2 to 1 wt % of catalyst;
wherein the combined wt % value of all components does not exceed 100 wt. %, and wherein all wt % values are based on the total weight of the composition.

6. The polymer blend of claim 1, wherein the catalyst comprises Zn, Sn, or Ag.

7. The polymer blend of claim 1, wherein the catalyst is zinc acetate.

8. The polymer blend of claim 1, wherein the polycarbonate is derived from the melt polymerization of bisphenol A with diphenyl carbonate.

9. A method of forming an article comprising:
(a) melt extrusion of
(i) 80 to 95 wt % polycarbonate; said polycarbonate having and endcap level of 45% to 80% and a branching level of 300-5,000 ppm

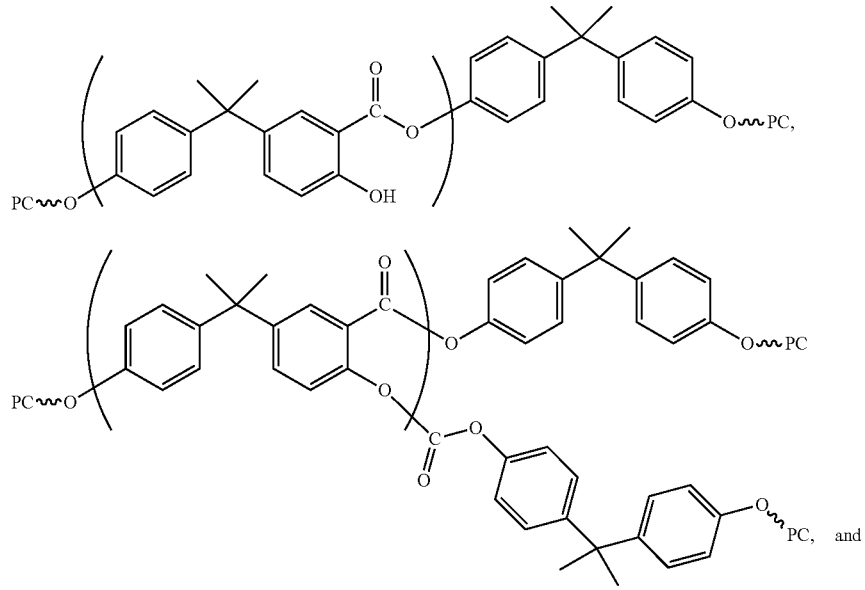

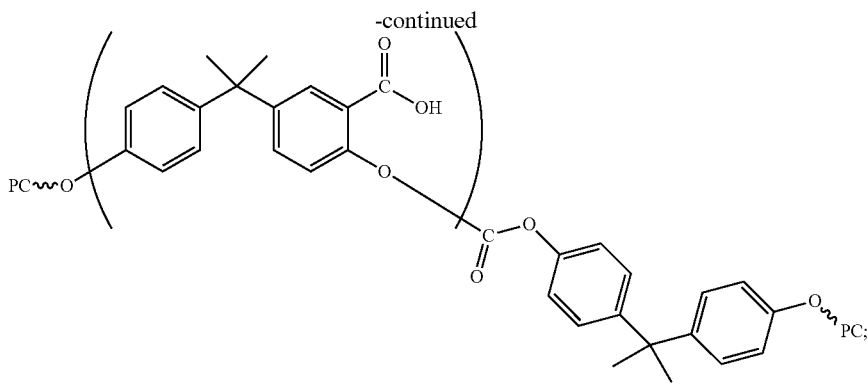

(ii) 4.9 to 20 wt % polymethyl methacrylate; and
(iii) 0.1 to 1.5 wt % of catalyst to produce a transparent polymer blend;
wherein said article is transparent,
wherein transesterification occurs with at least a portion of the polycarbonate and the polymethyl methacrylate during melt extrusion; and
wherein the combined wt % value of all components does not exceed 100 wt. %, and wherein all wt % values are based on the total weight of the composition and
(b) molding the polymer blend into said article.

10. The method of claim 9, wherein the molding comprises compression or injection molding.

11. The method of claim 9, wherein said melt extrusion utilizes a screw extruder of at least 75 rpm.

12. The method of claim 9, wherein the extruder temperature is from 230° C. to 300° C.

13. The method of claim 9, wherein the article comprises
(i) 80 to 95 wt % polycarbonate;
(ii) 4.9 to 20 wt % polymethyl methacrylate; and
(iii) 0.2 to 1 wt % of catalyst;
wherein the combined wt % value of all components does not exceed 100 wt. %, and wherein all wt % values are based on the total weight of the composition.

14. The method of claim 9, wherein the polycarbonate comprises at least 200 ppm of hydroxide groups.

15. The method of claim 9, where in the article is a graphical display or optical display.

16. A method for forming a transparent polymer blend comprising melt extrusion of
(i) 80 to 95 wt % polycarbonate; said polycarbonate having and endcap level of 45% to 75%;
(ii) 4.9 to 20 wt % polymethyl methacrylate; and
(iii) 0.1 to 1.5 wt % of catalyst;
wherein transesterification occurs with at least a portion of the polycarbonate and the polymethyl methacrylate during melt extrusion; and
wherein the combined wt % value of all components does not exceed 100 wt. %, and wherein all wt % values are based on the total weight of the composition.

17. The method of claim 16, wherein said melt extrusion utilizes a screw extruder of at least 75 rpm.

18. The method of claim 16, wherein the extruder temperature is from 230° C. to 300° C.

19. The method of claim 16 wherein the polycarbonate comprises at least 200 ppm of hydroxide groups.

20. The method of claim 16, wherein the polymer additionally comprises a flame retardant, anti-drip agent, antioxidant, antistatic agent, chain extender, colorant, de-molding agent, dye, flow promoter, flow modifier, light stabilizer, lubricant, mold release agent, pigment, quenching agent, thermal stabilizer, UV absorbent substance, UV reflectant substance, UV stabilizer, or a combination comprising at least one of the foregoing.

* * * * *